United States Patent [19]
Heeney

[11] 3,798,883
[45] Mar. 26, 1974

[54] GAS SCRUBBER, ENTRAINMENT SEPARATOR AND COMBINATION THEREOF

[75] Inventor: John M. Heeney, Chicago, Ill.
[73] Assignee: Fuller Company, Catasauqua, Pa.
[22] Filed: Aug. 27, 1970
[21] Appl. No.: 67,546

Related U.S. Application Data
[62] Division of Ser. No. 748,846, July 30, 1968, Pat. No. 3,597,901.

[52] U.S. Cl. .............................. 55/456, 55/463
[51] Int. Cl. ............................................ B01d 45/12
[58] Field of Search ............. 55/235, 236, 237, 238, 55/426, 427, 456, 457

[56] References Cited
UNITED STATES PATENTS

| | | | |
|---|---|---|---|
| 1,836,004 | 12/1931 | Becker | 55/456 |
| 1,952,308 | 3/1934 | Bowen | 55/236 |
| 2,624,503 | 1/1953 | Kutcher | 55/238 |
| 1,548,066 | 8/1925 | Steinbart | 55/456 |
| 3,420,040 | 1/1969 | Neely et al | 55/456 |
| 2,208,673 | 7/1940 | Hopkins | 55/456 |
| 3,358,413 | 12/1967 | Kalika | 55/238 |

Primary Examiner—Tim R. Miles
Assistant Examiner—Steven A. Markowitz
Attorney, Agent, or Firm—Frank H. Thomson

[57] ABSTRACT

A gas scrubber for removing particles carried in suspension by gas is used with or without a specific entrainment separator. The scrubber has (1) a gas-conducting conduit with a portion having an inner surface that diverges in the direction of gas flow, (2) a diverter that is disposed in this portion of the conduit and that has an opposed diverging surface with a greater degree of divergence, and (3) a pipe that feeds scrubbing liquid to that surface of the diverter for flowing liquid into the downward flow of gas. Preferably, the diverter is supported from above and is resiliently urged upwardly so that the diverter is automatically moved by a change in the rate of gas flow. The scrubber provides an annular flow of gas that is changed to a helical downward flow by the specific entrainment separator, disposed below the diverter and having helically extending elongated plates in a vertical conduit within a chamber. A frustoconical diverter is disposed below the bottom open end of that vertical conduit to change the direction of the gas leaving the vertical conduit. The elongated plates are radially disposed within the vertical conduit and extend in a helical manner about the longitudinal axis of that conduit. Another conduit communicates tangentially with a sidewall opening of the chamber adjacent its top to exhaust the gas from the annulus between the chamber and the vertical conduit. Accumulated liquid is removed from the bottom of the chamber.

6 Claims, 11 Drawing Figures

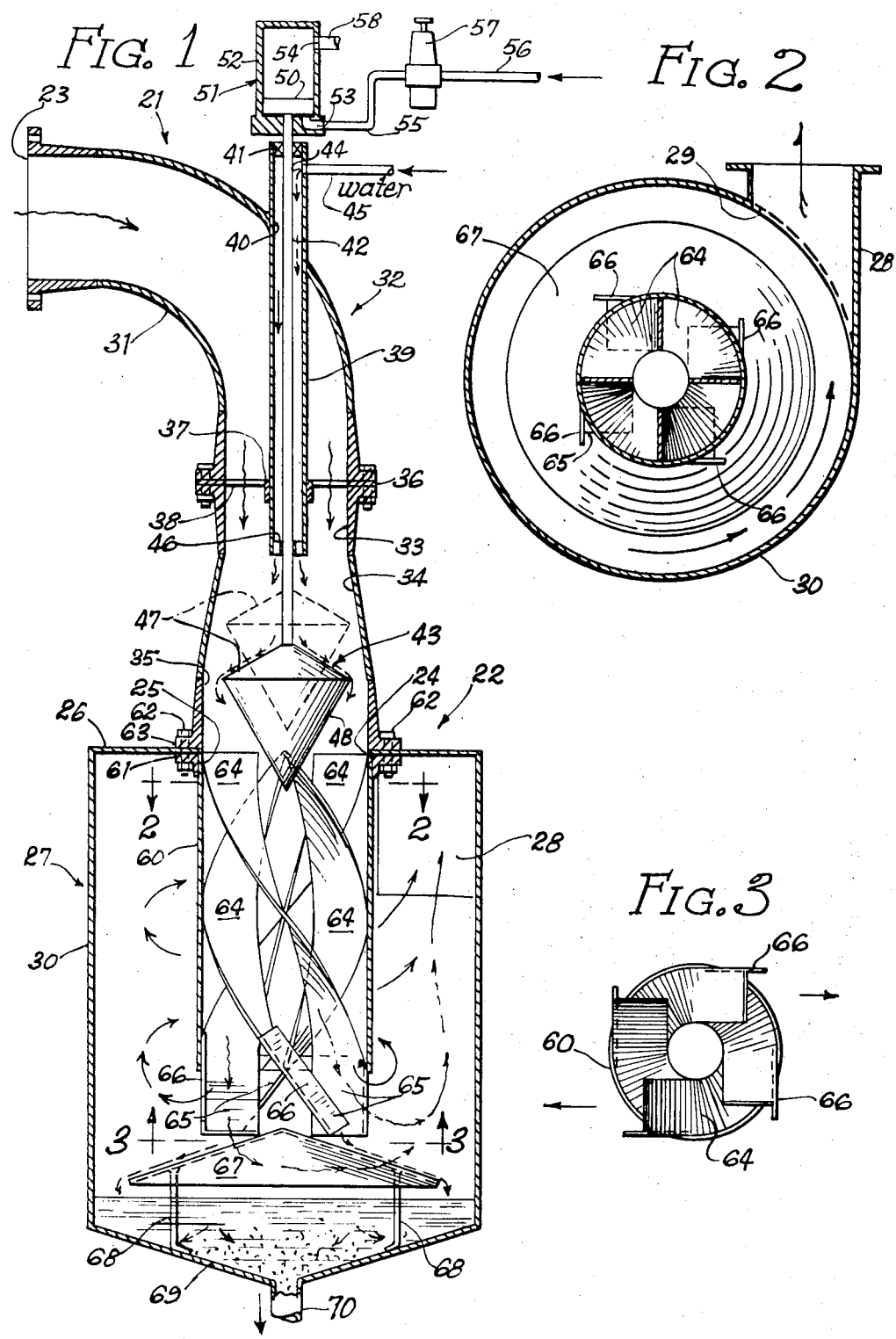

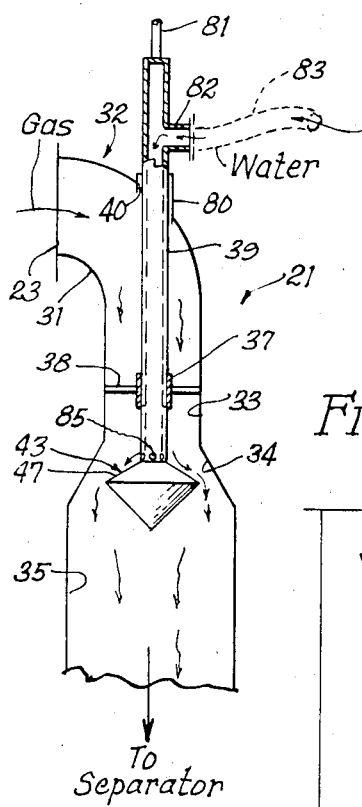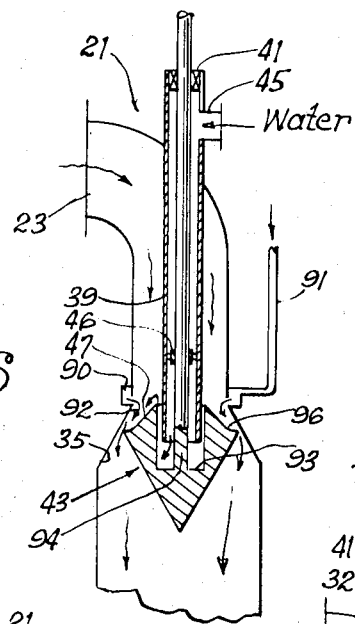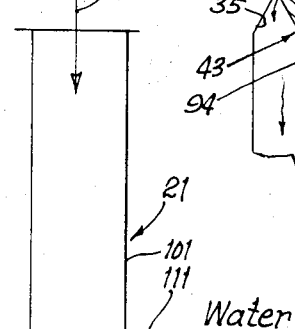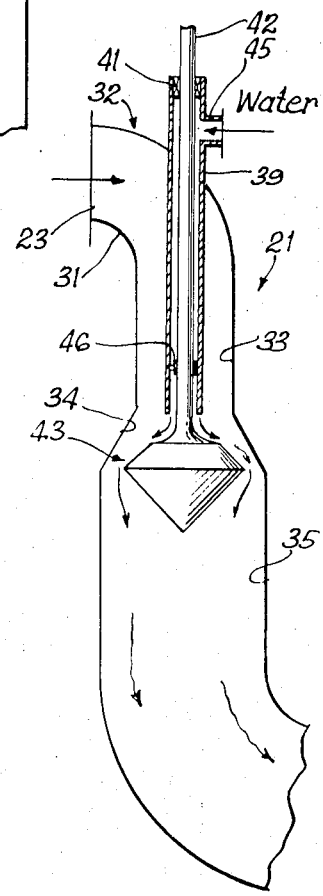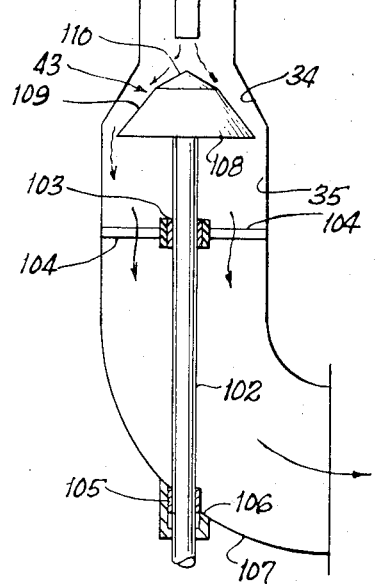

PATENTED MAR 26 1974 3,798,883

GAS SCRUBBER, ENTRAINMENT SEPARATOR AND COMBINATION THEREOF

This application is a division of application Ser. No. 748,846 filed July 30, 1968, now U.S. Pat. No. 3,597,901.

BACKGROUND OF THE INVENTION

1. Field of the Invention

This invention relates to a scrubber, i.e., and apparatus that can be used to scrub gas with liquid to remove certain materials. Many waste gases in industry contain solid particles that are entrained by the gas and that are either valuable materials requiring their recovery or are materials that present air pollution problems when such gas is ultimately exhausted to the atmosphere. In other cases, waste gas contains a material that can be removed by scrubbing with a liquid in which such material is soluble. In still other cases, it is desirable to remove both the particulate material entrained in the gas and certain gaseous components that are soluble in scrubbing liquid. Water is the usual scrubbing liquid.

The invention particularly relates to an apparatus that provides an intimate mixture of the scrubbing liquid and the gas to be treated. The apparatus is such that the gas during its flow through the apparatus separates the liquid into extremely small liquid particles that contact the small solid particles entrained in the gas. Thereafter the physical mixture of gas and entrained particles of scrubbing liquid, containing trapped solid particles and/or materials dissolved from the gas by the liquid, are passed to an apparatus that separates the liquid particles from the gas.

Scrubbing apparatus is usually built with a specific combination of dimensions that provide for a particular optimum narrow range of rate of gas flow. As a result, most of the prior constructions of gas scrubbers require specifically designed units that cannot operate efficiently when the gas flow is below or exceeds the limited range for which the scrubber is designed.

The apparatus that usually provide for a centrifugal separation of scrubbing liquid particles and the gas likewise have their effectiveness affected by a substantial change in the rate of gas flow. Such separator is constructed to receive in its chamber a horizontal tangential flow of gas containing entrained particles of scrubbing liquid. The entrainment separators are not designed to receive a vertical, generally annular, flow of gas.

2. Description of the Prior Art

U.S. Pat. No. 3,116,348 discloses a gas scrubber in which gas to be treated is passed downwardly through a conduit having a zone in which the inner surface of the wall of the conduit is frustoconical and converging in the direction of gas flow. In that zone the scrubber of the patent includes a diverter which is a disc that extends transversely of the direction of gas flow and that has its center at the longitudinal axis of the conduit. The peripheral surface of the disc, of course, is spaced from the downwardly converging inner surface of this zone of the gas-conducting conduit to permit gas to flow but with a pressure drop from below by a pipe that is concentric with this gas-conducting conduit. The disc has an opening so that scrubbing fluid can be forced upwardly, through the pipe and the disc, to contact a deflector member that is parallel to the disc but of smaller diameter than the disc. The spacing between deflector and disc is adjustable. The pipe and the disc that it supports are adjustably positioned within the duct. The movement upwardly or downwardly is accomplished mechanically under the control of a gas flow- or pressure-sensing means that is mounted in the conduit upstream of the disc.

In the scrubber of U.S. Pat. No. 3,116,348, the liquid is diverted downwardly by the deflector and flows downwardly to the top surface of the disc and then to the space between the disc and the converging wall surface of the conduit. As a result, this liquid is broken up into small particles by the gas. These small liquid particles contact and remove the solid particles as well as any gas that is soluble in the scrubbing liquid. After this mixture of liquid particles and gas pass downwardly through the annulus that is formed between the disc and the downwardly converging wall surface, there is substantial pressure drop. The gas continues its downward flow. The gas with its entrained particles of scrubbing liquid then is diverted to a horizontal flow by a downstream curved portion of the conduit. This end of the conduit communicates tangentially with a sidewall opening of an entrainment separator in which this gas is given a centrifugal path of travel by which liquid particles fall to the bottom of the tank for collection and removal while the gas moves to a top opening in the separator.

U. S. Pat. No. 3,350,076 discloses a gas scrubber that is stated to be an improvement over the scrubber disclosed in the patent mentioned above. In the scrubber of this later patent, the disc of the prior scrubber is present along with the deflector. The tube that supports the disc feeds scrubbing liquid to the deflector which directs the liquid to the top surface of the disc. In this later scrubber, the disc and the downwardly converging inner surface of the conduit is spaced a greater distance than in the case of the earlier scrubber. However, the space through which the gas must pass is limited by an expandable toroidal tube that is mounted on the undersurface of the marginal portion of the disc. The outermost portion of this toroidal tube is beyond the periphery of the disc to provide an annulus between the outersurface of this section of the tube and the downwardly converging innersurface of the wall of this portion of the conduit. Pressurized air is supplied to the toroidal tube by a pipe extending through the wall of the conduit and into the tube. The pressure of the air determines the degree of the expansion of the tube and thus determines the width of this annulus through which the gas being treated must pass. The disc and toroidal tube are maintained at a fixed elevation. Variation in gas flow is compensated for by the change in the width of this annulus through the change in the degree of expansion of the toroidal tube.

U.S. Pat. No. 2,621,754 describes a different construction for a gas scrubber but, again, the scrubbing occurs in an end zone of a gas-conducting duct that is converging in the direction of gas flow. A throttle, that is disposed within the conduit, has a bottom part that is downwardly converging where it opposes this converging end of the gas conduit to create an annulus through which the gas must pass before there is a pressure drop. Water is fed tangentially to the gas stream in the form of a spray of liquid above the throttle.

U. S. Pat. No. 2,621,754 also describes various prior methods for removing suspended material from gases, namely, methods that use apparatus known as spray towers, centrifugal scrubbers, bag filters, cyclone separators, and electrostatic precipitators. A gas scrubber for removal of suspended particles over a wide range of size, including submicron size, is claimed to be more suitable than the other types of apparatus mentioned above.

SUMMARY OF THE INVENTION

This invention relates to a gas scrubber, to an entrainment separator and to a combination of the two. The gas scrubber of the present invention is an apparatus that includes a conduit to conduct a gas to be treated by scrubbing with a liquid while passing in a downward direction. The conduit includes a portion in which the wall of the conduit has an inner surface that diverges in the downward direction, i.e., in the direction of gas flow. The apparatus also includes a gas-diverting means supported in that portion of the gas-conducting conduit. At least a portion of the upper surface of the gas-diverting means faces or opposes that diverging inner surface of that portion of the conduit. That surface portion of the gas-diverting means is downwardly diverging at a greater rate of divergence than that of the diverging, opposing inner surface of the conduit. These opposed diverging surfaces are generally frustoconical surfaces.

The downwardly diverging surface of the gas-diverting means constitutes a major portion of the outer part of the upwardly facing surface of the gas diverting means and can extend to the periphery of that upwardly facing surface; however, a small outer marginal part of that upwardly facing surface can be normal to the vertical axis and in that case that marginal surface can be joined to the frustoconical part by a concavely curved portion of the surface so that the downwardly diverging portion changes to a horizontal marginal surface through a curved surface so that the three surfaces along a line correspond generally to a top surface of a ski jump.

The gas scrubber of the present invention further includes means to support the gas-diverting means so that it is located concentric with the portion of the conduit that has the downwardly diverting inner surface. Also included in the gas scrubber of the present invention is means to furnish scrubbing liquid to the upwardly facing, downwardly diverting surface portion mentioned above as part of the gas-diverting means.

As seen later in connection with some of the preferred embodiments of this apparatus, the gas-diverting means is preferably supported from above by a rod that is connected to the top of the gas-diverting means and that extends vertically up through the conduit. At the same time the rod extends through a liquid-feeding pipe that has a bottom outlet from which the liquid can flow on to the downwardly diverging surface portion of the gas-diverting means.

In another illustrated embodiment described below, the support for the gas-diverting means is a rod that extends downwardly from the gas-diverting means and ultimately passes through the wall of the gas-conducting conduit. In this embodiment of the scrubber, a water pipe has an outlet above the top surface of the gas-diverting means and the pipe above that outlet extends through the sidewall of the conduit.

Also seen later with respect to the especially preferred embodiment of the scrubber of this invention the support for the gas-diverting means, i.e., the rod that extends upwardly, is supported at its other end in a manner to resiliently urge upwardly the gas-diverting means. Thus the latter assumes a maximum elevation at minimum gas flow rate. This elevation is substantially above its minimum elevation which occurs during maximum gas flow rate. In both positions and in the intermediate positions for the gas-diverting means, its downwardly diverging surface always opposes a part of the downwardly diverging inner surface portion of the conduit.

The other apparatus of the present invention, namely, the entrainment separator, is useful for the separation of scrubbing liquid from the gas in which it has become entrained in a gas scrubber and when the general flow of such gas from the zone of pressure drop in the scrubber is an annular flow. Such annular flow is obtained by utilizing the gas scrubber of this invention and can be obtained by the use of some of the gas scrubbers of the prior art. It is preferred that this entrainment separator be utilized in combination with the gas scrubber of the present invention. Such combination also constitutes an apparatus of this invention.

The entrainment separator of the invention comprises a vessel that preferably has its sidewall in cylinder form. This vessel of the entrainment separator has an opening in its top wall for communication with a bottom opening or outlet of a gas-conducting conduit that is part of a gas scrubber that provides such annular flow at the outlet. This opening in the top wall of the vessel, that provides the large outer chamber for the separator, is circular, preferably with its center at the longitudinal axis of the vessel having the preferred cylindrical sidewall. The separator includes a vertical cylindrical conduit or pipe that is disposed concentric with the top opening of the vessel. The vertical pipe or conduit of the separator provides an inner chamber and has an inner diameter generally corresponding to the outer periphery of the annular flow of gas to be received from the gas scrubber.

The entrainment separator also includes means within the vertical conduit to divert the annular flow of gas into a helical flow of gas about an axis concentric with the vertical conduit. This diverting means, to provide a helical flow in this inner chamber, comprises preferably a number of elongated plates that extend from the inner surface of the vertical conduit in a radial direction toward the longitudinal axis of that vertical conduit. At the same time the plates extend from the inner surface of the vertical conduit in a radial direction toward the longitudinal axis of that vertical conduit. At the same time the plates are twisted helically in their direction of elongation, i.e., downwardly, and about a common vertical axis concentric with the longitudinal axis of the vertical conduit to provide a helical path for arcuate segments of the annular flow. These elongated helically-directed plates have their inwardly facing elongated edge spaced from that common axis. In the preferred embodiment these inner edges of the plates abut a vertical pipe that is within and is coaxial with the vertical conduit that surrounds these plates. This construction insures the maximum degree of imparting of the helical flow of the gas from the scrubber to the bottom of the vertical conduit of the entrainment separator.

In the preferred embodiment for the construction of the elongated plates of the entrainment separator, the bottom portion of these plates in the vertical conduit has a reduced pitch with respect to their spiral direction in comparison with that for the top part of these plates. This can be a gradual reduction in the pitch from the top to the bottom of these plates. This pitch reduction from top to bottom provides an acceleration of the degree of helical flow of the gas through the vertical conduit in which these plates are located.

The entrainment separator has a bottom outlet for withdrawing separated scrubbing liquid with its entrained solid particles and/or dissolved gas. The separator also includes a deflector plate supported above the bottom wall of the vessel and above the liquid level to be maintained in the entrainment separator. This deflector has a larger dimension than the vertical conduit in which the helical path of flow is imparted to the gas and its upper surface is annularly disposed with respect to the longitudinal axis of that vertical conduit. Preferably this deflector plate has a conical upper surface with its apex located in the longitudinal axis of the vertical conduit of the separator. This deflector plate or means receives liquid separated from the gas during its passage through the vertical conduit and allows the liquid to flow downwardly and outwardly to the periphery of that plate from which it falls to the level of liquid to be maintained in the bottom of the vessel of the entrainment separator. At the same time this deflector means prevents the gas from the vertical conduit from contacting the pool of liquid at the bottom of the vessel. This prevents a mixing of the gas with the pool of liquid. Furthermore, this plate also assists in the change in direction of the gas that has left the vertical conduit, so as to force the gas to flow upwardly around the vertical conduit within the annulus or space between that conduit and the vessel of the entrainment separator. This rapid change in direction, which can be effectuated in part by additional diverters or change in shape of the bottom ends of the elongated plates below the vertical conduit, results in a further separation of water particles from the gas. The gas in its upward flow continues to have a helical pattern of flow that provides further separation, if necessary, of liquid from the gas.

To maintain this desirable flow in that annulus within the vessel, the entrainment separator includes an outlet conduit for the vessel that is in communication with an opening in the sidewall of the vessel adjacent the top wall. The horizontal longitudinal axis of the outlet conduit is tangential to a concentric circle within the cylindrical vessel and the outlet extends from that sidewall in a direction corresponding to one component of direction of gas flow at that opening in the sidewall. This avoids an exit of gas in a horizontal direction requiring a reversal of direction of flow of gas that would adversely affect the helical flow upwardly in the annulus between the vessel and the vertical conduit.

The bottom end portion of the vertical conduit is provided preferably with a number of notches that are generally triangular in shape and corresponding to the number of elongated plates within that conduit. Thus each notch has a vertical edge and a downwardly inclined edge from the top of the vertical edge in the direction of the helical path of the elongated plates. The inclined edge is somewhat curved concavely as viewed from below. The lowermost part of the conduit abuts preferably the deflector cone. Also preferably vertical baffles extend outwardly, preferably tangentially, from these vertical edges of the conduit that define part of the notches. These baffles abut the deflector plate and can extend beyond it to or almost to the wall of the vessel.

This construction insures the desirable rapid change in direction of gas flow from downward to upward and does not disrupt the direction of helical flow, i.e., clockwise or counterclockwise, as viewed from above, that is determined by the helical twisting of the elongated plates.

DESCRIPTION OF THE DRAWINGS

The drawings show preferred embodiment of the scrubber of the present invention or of the entrainment separator of the invention or of various combinations of these embodiments of the gas scrubber and the entrainment separator. In these drawings similar parts are generally identified by the same numerals.

FIG. 1 is a vertical sectional view of a combination of one embodiment of the gas scrubber of the invention combined with one embodiment of the entrainment separator of the present invention.

FIG. 2 is a cross-sectional view of the entrainment separator as shown in FIG. 1 and taken along the line 2—2 of FIG. 1.

FIG. 3 is a fragmentary bottom plan view of part of that entrainment separator as seen from line 3—3 of FIG. 1.

FIG. 4 is a fragmentary vertical section, partly schematic and partly broken away, showing another embodiment of the gas scrubber of the invention.

FIG. 5 is a fragmentary vertical section, partly schematic, of still another embodiment of the scrubber of the present invention.

FIG. 6 is a vertical section, also partly schematic, of still a further embodiment of the gas scrubber of the invention.

FIG. 7 is a fragmentary vertical section, partly schematic, of yet another embodiment of the scrubber of the present invention.

DETAILED DESCRIPTION

Figure 8:
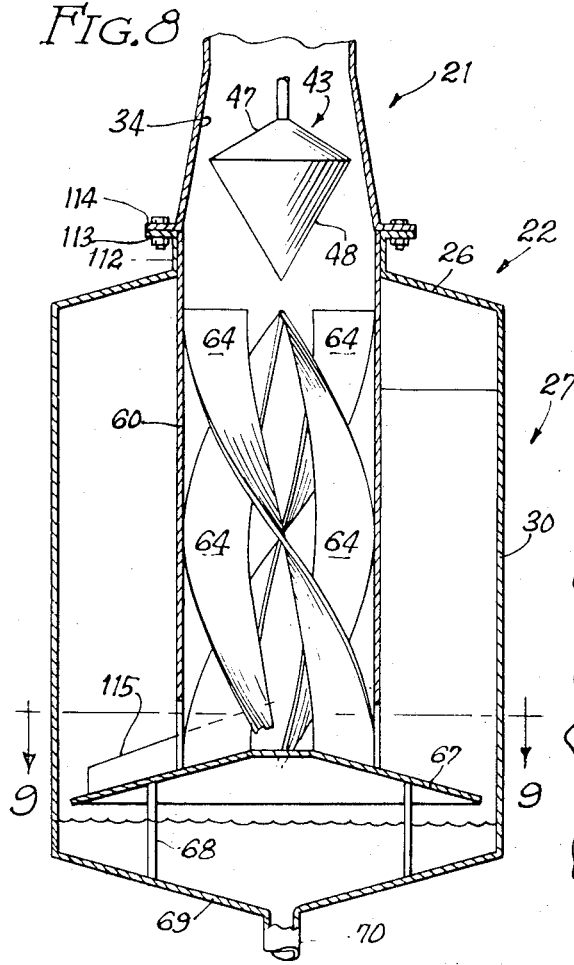
FIG. 8 is a vertical section of another embodiment of the entrainment separator of the present invention and a fragmentary sectional view of the bottom part of one embodiment of the gas scrubber of the invention.

FIG. 1 illustrates an apparatus of the present invention, namely, a combination of gas scrubber and entrainment separator. The apparatus comprises a gas scrubber generally indicated at 21 and an entrainment separator indicated at 22. The gas scrubber 21 has an inlet 23, that receives in this illustration gas in a horizontal flow, and has a bottom outlet 24 that exits the gas in a downwardly vertical direction into the central inlet opening 25 of a top wall 26 of a vessel generally indicated at 27 of entrainment separator 22. The gas then exits from vessel 27 by a conduit 28 that communicates with an opening 29 (see FIG. 2) in a sidewall 30 of vessel 27.

The gas scrubber 21 includes an arcuate or curved portion 31 of a gas-conducting conduit 32 that is tubular. The conduit 32 has a bottom portion that has a wall with an inner cylindrical surface in portion 33 below which is a downwardly diverging, somewhat frustoconical surface 34 that is intermediate surface 33 and a cylindrical surface 35 that extends to outlet 24 of gas-conducting conduit 32.

The wall of the bottom part of conduit 32 is flanged at both ends and the bottom flanged end is mounted on wall 26 so that cylindrical surface 35 is an extension of top wall 26 at opening 25 so that outlet 24 communicates to the full extent with vessel 27 at opening 25. At the same time the top flanged end of this lower portion of conduit 32 is bolted to the flanged bottom end of curved pipe 31. Between these flanges, that are bolted together to join the two portions of conduit 32, is mounted a peripheral ring 36 that is joined to a sleeve 37 by spider spokes 38 so that sleeve 37 is centrally positioned at the inlet of the bottom part of conduit 32 adjacent the outlet of curved portion 31 without impeding gas flow through conduit 32.

The sleeve 37 provides a part of the positioning for a water-supply tube 39 that is vertically disposed in the vertical part of curved portion 31 and extends through sleeve 37 into the bottom part of conduit 32. Tube 39 extends upwardly through an opening 40 in a curved portion 31. At this opening it is joined to gas-conducting conduit 32. The upper extension of tube 39 is above an opening 40 and has a bearing 41 in which is received rod 42 that supports a gas-diverting means generally indicated at 43 in the bottom part of conduit 32.

Adjacent to the top end of tube 39 is an opening 44 for connection of tube 39 with a pipe 45 that is connected to a water supply (not shown). Thus water from the supply is fed to tube 39 and passes out its bottom end at which is located a spider bearing 46 that maintains with bearing 41 a coaxial positioning of rod 42 with respect to tube 39 that is fixedly supported as described above. The bearings 41 and 46 permit axial movement of rod 42.

The gas-diverting means 43 is mounted on the bottom end of rod 42. The gas-diverting means 43 has an upwardly facing surface 47 that is downwardly diverging to its maximum width below which gas-diverting means 43 has an inverted conical surface 48. The degree of divergence of surface 47 is greater than the degree of divergence of surface 34 of the gas-conducting conduit 32, that it faces at its various elevations at which it is supported by rod 42.

The gas-diverting means 43 and its support rod 42 are upwardly urged by a piston 50 that is part of an air cylinder generally indicated at 51 that further includes a cylinder 52 having a bottom end inlet 53 and an outlet 54 adjacent the top end of cylinder 52. The inlet 53 communicates with a pipe 55 that is connected to a pipe 56 by a pressure regulator 57 that is also a pressure relief valve. The pipe 56 is in communication with a pressurized air source (not shown). The outlet 54 of cylinder 52 is connected to a pipe 58 that is open in the use of air cylinder 51. The piston 50 is raised to a desired height by pressurized air in the bottom chamber of cylinder 51. The pressure of air admitted to cylinder 51 below piston 50 is controlled by regulator 57.

The pressure of air in the lower chamber of cylinder 52, i.e., the chamber below piston 50, is chosen so that gas-diverting means 43 is elevated to a position corresponding to the minimum gas flow expected for the use of gas scrubber 21. For illustration, it is assumed that this position is that shown in dotted lines in FIG. 1. As the gas flow is normally greater than the expected minimum, the gas flow shown by the arrow at the upper left-hand part of curved portion 31 passes downwardly into the bottom portion of conduit 32 where it is impeded by the constriction effectuated by the presence of gas-diverting means 43 within the bottom portion of conduit 32. As a result, the pressure of this flowing gas forces downwardly gas-diverting means 43 that is resiliently urged upwardly by air cylinder 51.

In FIG. 1 the lowermost position of gas-diverting means 43 is illustrated by solid lines that show the outline or shape of the gas-diverting means. In this illustration it is assumed that gas is flowing into gas scrubber 21 at a rate and a gas pressure sufficient to move gas-diverting means 43 downwardly from the position shown in dotted lines to this lowermost position. As the gas flow rate is decreased, in view of existing variations in flow, the downward force on gas-diverting means 43 will decrease. As result air cylinder 51 will raise gas-diverting means 43 until the annulus between it and diverging surface 34 is decreased to the extent that the back pressure prevents any further upward movement of gas-diverting means 43 by air cylinder 51.

During the operation of gas scrubber 21, the forces acting on gas-diverting means 43, which can also be referred to as an orifice pressure drop regulator, are the weight of that regulator and rod 42 and the reaction forces of the scrubbing liquid and the gas stream. These forces are opposed by a constant force that is supplied by a pneumatic cylinder, illustrated by air cylinder 51, or by any other similar device such as an adjustable spring-force mechanism. The weight of the pressure drop regulator assembly and the reaction force of the scrubber liquid will remain essentially constant for any given unit. The reaction force of the gas stream is proportional to the pressure drop across the pressure drop regulator. Since the opposing force is maintained at a constant value by means of a pressure regulator and relief valve, the orifice pressure regulator will automatically adjust its position in the divergent duct section, i.e., the section of gas-conducting conduit 32 that has downwardly diverging inner wall 34, so as to maintain the pressure drop required to maintain a force equilibrium for a wide range of system volumes.

Any desire pressure drop, which is proportional to the efficiency of the scrubbing action, can be attained and then maintained by adjusting the external force for the system, i.e., by adjusting the upwardly urging force provided by the air cylinder.

The inverted conical surface 48 of the bottom part of gas-diverting means 42 acts as a diffuser to provide some static regain from the high velocity gas stream. This is one other advantage of the gas scrubber of this embodiment of the present invention.

The entrainment separator 22 receives the generally annular gas flow from gas scrubber 21 when the gas flow exits from bottom opening 24 of scrubber 21 and enters top opening 25 of vessel 27. This gas flow is prevented from diverging into the entire width of vessel 27, as it passes through opening 25, by the presence of a vertical conduit 60 that has a top flange 61. The outwardly directed flange 61 abuts the bottom surface of top wall 26 of vessel 27 and is fixed in position by bolts 62 that also extend through a flange 63 at the bottom end of conduit 32. The flange 63 is mounted on top wall 26.

A number of elongated plates 64 are fixedly mounted in a vertical conduit 60. The plates 64 are twisted in a helical path about the longitudinal axis of vertical conduit 60. The plates 64 have their outer elongated edges abutting vertical conduit 60. The plates 64 have their width extending inwardly along radii of vertical conduit 60, but in this preferred embodiment plates 64 have a width less than the radius of cylindrical vertical conduit 60. Thus a central cylindrical passage extends from the top of conduit 60 to its bottom end. The elongated plates 64 divide the outer annular portion of any cross section of conduit 60 into a number of segments that extend downwardly from opening 25 to the bottom open end of conduit 60 but these segments provide a helical path because of the nature of the twisting of plates 64. This helical path converts the received generally annular downward flow of gas and converts it to a downward helical flow about the longitudinal axis of conduit 60.

As seen in FIG. 1, the bottom ends of elongated plates 64 have extensions 65 that are below conduit 60. These extensions 65 are not twisted, as are the main portions of plates 64, but they are tilted with respect to the longitudinal axis of conduit 60. Furthermore, extensions 65 have flanges 66 that are upwardly directed and at right angles to the main part of extensions 65.

The helical path of the gas passing downwardly through conduit 60 as provided by plates 64 results in a separation of entrained liquid particles from the gas and these particles fall onto the upper surface of plates 64 and the inner surface of conduit 60. The liquid deposited on plates 64 flow downwardly along the top surface of extensions 65 onto a conical diverter 67 that is supported by legs 68 that are mounted on an inverted concial bottom wall 69 of vessel 27. The wall 69 has a central outlet 70 for withdrawal of fluid separated from the gas. The legs 68 support conical diverter 67 above the level of liquid in the bottom part of tank 27. The separated liquid is withdrawn through outlet 70 at a sufficient rate to maintain this spacing.

The flanges 66 prevent the gas from sweeping across the surface of extensions 65 over which separated water or other scrubbing liquid is flowing; otherwise, the gas would pick up some water and this would be undesirable.

As liquid falls onto the conical diverter 67, it flows down its top surface which is inclined, of course, and flows off the periphery of diverter 67 and down to the body of separated liquid that is below.

The helically travelling gas from which the liquid has been separated travels radially and upward with respect to the longitudinal axis of vessel 27 to continue a helical path. That travel is in the annulus between conduit 60 and sidewall 30. The helical flow upwardly through the annulus is generally the same as that direction for the flow downwardly within conduit 60 as these flows would be viewed from above.

Referring to FIG. 4, the gas scrubber of this embodiment has a top arcuate portion 31 for gas-conducting conduit 32 and an inlet opening 23. The bottom portion of conduit 32 has cylindrical surface 33, frustoconical surface 34 and cylindrical surface 35 in that order in the downward direction. The sleeve 37 serves as a bearing for water tube 39, The sleeve 37 is supported by spokes 38 supported by conduit 32. At the place where tube 39 extends through opening 40 in conduit 32, there is a bearing 80. Tube 39 is adjustably supported by a rod 81 that is moved in a vertical direction by suitable means (not shown) to position the gas-diverting means 43 mounted on the bottom end of tube 39. The tube 39 near its top end has a side tube 82 that is connected to a flexible tube 83 that is connected to a water supply (not shown). The tube 83 is flexible to permit its connection with tube 82 even though the latter is moved vertically.

The gas-diverting means 43 has a top upper surface 47 that is downwardly diverting to a greater degree than the divergence of surface 34 of conduit 32. This difference in the degree of divergence, that is the difference between the included angles of the divergences, is preferably such in this embodiment and in appropriate other embodiments that the vertical movement decreases the spacing between gas-diverting means 43 and diverting surface 34 upon upward movement of the former. This occurs upon a decrease in gas flow. This change in spacing does not change the velocity of gas flow between diverging surface 34 and the peripheral part of the upper surface 47 of gas diverting means 43. Thus, the pressure drop remains about the same and the efficiency of the scrubber remains somewhat constant.

The scrubbing liquid, that is fed to tube 39, flows out holes 85 at the bottom portion of tube 39 onto surface 47.

The gas scrubber 21 in FIG. 4 can be mounted on and in communication with an entrainment separator of the invention such as the type shown in FIG. 1 or can communicate by a bottom bend in conduit 32 to provide a horizontal path of travel to a conventional entrainment separator that has been described above. Of course, the latter combination is also the case with respect to scrubber 21, that is shown in FIG. 1 in combination entrainment separator 27 of the present invention.

Referring to FIG. 5, the gas conducting conduit 32 has generally the same construction as that shown in FIG. 4 except for one modification, namely, the modification that appears at the juncture of the bottom portion of conduit 32 between cylindrical inner surface 33 and frustoconical inner surface 34. At that zone, the apparatus is provided with an annular pipe 90 that is fed water by a pipe 91 from a water supply (not shown). In addition, annular pipe 90 has inwardly directed openings communicating with complementary openings in conduit 32 to provide water inlets 92 for the introduction of water into the path of travel of the gas flow and to flow downwardly along surface 34. Because surface 34 is downwardly diverging, the erosion by the gas to be treated is greatly minimized whereas the erosion of the downwardly converging surface utilized in apparatus of the prior art is a substantial problem that is not adequately solved by flowing water along that surface. The erosion is attributed, at least in part, to solid particles that are being carried into scrubber 21 or scrubbers of the prior art. In those gas-conducting conduits of the prior art, the inclined wall is facing the oncoming gas stream whereas the gas scrubber of the present invention this surface is facing in the opposite direction.

The scrubber 21 shown in FIG. 5 differs from that shown in FIG. 4 in several other respects. The gas-diverting means 43 has the general shape of those shown in FIGS. 1 and 4, except as stated below. The gas-diverting means 43 of FIG. 5 has, in its upper surface 47, an annular recess 93 that is coaxial with water pipe 39. The bottom open end of pipe 39 extends in recess 93. The gas-diverting means 43 includes a central upstanding rod 94 that extends upwardly and coaxially with recess 93. The rod 94 extends through the entire length of water tube 39 and above and is a support that is mounted on a fixed support (not shown). The rod 94 can be adjustably raised or lowered or can be automatically lowered as in the case of rod 42 of scrubber 21 in FIG. 1 by an air cylinder or other equivalent means.

The rod 94 maintains tube 39 in its coaxial position by bearing 41 at the top end of tube 39 and by bearing 46 intermediate the two ends of tube 39 so that gas-diverting means 43 can be raised or lowered relative to surface 34 and relative to pipe 39. The pipe 39 is fixedly mounted at its entrance into conduit 32.

As seen in FIG. 5, surface 47 outwardly of recess 93 is downwardly diverging at a uniform rate for a substantial distance and then diverting at a decreasing rate to or almost to the juncture between surface 47 and surface 48 of the lower portion of gas-diverting means 43. As a result, the outermost part 96 of surface 47 is arcuate in any line. The result is a surface 47 that along a radial line has the shape generally of the longitudinal top surface of a ski jump.

Water is fed to tube 39 by side tube 45 that receives water from the supply (not shown). This water flows downwardly to the bottom part of tube 39 where it flows between tube 39 and central rod 94 into the lowermost part of recess 93. Then it flows upwardly in the annulus between tube 39 and recess 93. It overflows from recess 93 along the ski jump surface 47 to the periphery of that surface. In this travel on surface 47 and thereafter in the constricted space between gas-diverting means 43 and diverging inner surface 35, the water is converted by the gas flow to liquid particles in the scrubbing action on the gas.

Referring to FIG. 6, gas-conducting conduit 21 has an upper part 101 that is cylindrical instead of the arcuate portion 31 of the earlier-described upper section 31 of FIGS. 1 through 5. This merely indicates that the gas being received in the lower portion of gas-conducting conduit 21, need not be arcuate. The rear difference in this embodiment is underneath support of gas-diverting means 43 by a rod 102. The gas-diverting means 43 is centrally supported at its bottom surface. The rod 102 is supported at its bottom ends by means (not shown). Movement of rod 102 in a direction other than its longitudinal axis is precluded by a bearing 103 supported by spider spokes 104 mounted on and supported at their outer ends by gas-conducting conduit 32, illustratively, in the region wherein cylindrical inner surface 35 is present. Similarly, lateral movement of rod 102 is prevented by a bearing 105 mounted on conduit 32 at an opening 106 in a still lower and arcuate portion 107 of gas-conducting conduit 32.

The gas-diverting means 43 of the embodiment illustrated by FIG. 6 has a bottom flat surface 108. The rest of the surface of gas-diverting means 43 is upwardly facing in the form of 2 frustoconical surfaces of different included angles 109 and 110. The upper surface 110 has the greater included angle. The lowermost frustoconical surface 109, like surface 47 of earlier-described gas-diverting means 43, also faces frustoconical surface 34 of gas-conducting conduit 32. As the gas flows downwardly between surfaces 34 and 110, there is an acceleration of gas flow because of the increasing constriction in the downward direction between these surfaces. At the bottom edge of surface 110 the gas reaches its maximum velocity. The upper frustoconical surface 110 receives a flow of water from a pipe 111 that extends horizontally through gas-conducting conduit 32 at or above the zone where cylindrical surface 33 is located. The pipe 111 is downwardly curved within conduit 32 and its bottom portion of conduit 32 is coaxially with gas-diverting means 43. The water flows outwardly along surface 110 and then along surface 109.

In this embodiment, the difference in the degree of divergence between surfaces 34 and 109 is such, that for any position of gas-diverting means 43, the area of the annular space will remain constant and the velocity of the gas as it passes between these surfaces will remain the same as it was when it passed the space between surface 34 and the bottom edge of surface 110. Of course, this area will change upon moving means 43 up or down. The scrubber of this embodiment does not provide for the automatic adjustment or positioning of gas-diverting means 43 that can occur with other embodiments such as that shown in FIG. 1.

Referring to FIG. 7, scrubber 21 has water pipe 39 mounted generally as shown in FIG. 5 with its water supplied by side pipe 45 from a water source (not shown). Again, a rod 42 supports gas-diverting means 43 in gas-conducting conduit 32 which has curved upper portion 31 and the lower portion with its cylindrical surface 33, frustoconical surface 34 and cylindrical surface 35 in that order going downstream. The rod 42 is supported for vertical movement by means (not shown) and is unitary at its bottom end with means 43. The rod 42 is maintained coaxially with pipe 39 by bearing 41 and 46. As in the earlier construction, bearing 41 also serves as a seal to prevent upward escape of water fed into pipe 39.

In this embodiment, the top part of upperly facing surface 47 is outwardly curved from rod 42 to an outer portion that is frustoconical and that has an included angle that is larger than that of inner surface 34 of conduit 32. With this configuration also, it is possible to provide a uniform pressure drop between the bottom of surface 47 and surface 34 at that transverse plane and to provide a desirable direction of flow throughout the height of frustoconical surface 47 regardless of the vertical movement of means 43 within the zone of conduit 32 where means 43 faces surface 34.

In the embodiment shown in FIG. 7, the bottom part of conduit 32 is extended in an arcuate manner as in the case of that of FIG. 6, but instead it could be mounted on entrainment separator 37 for the use of the latter as described earlier in connection with FIG. 1.

Referring to FIG. 8, scrubber 21 possesses basically the construction of scrubber 21 in FIG. 1 except for the absence of cylindrical surface 35. That surface is provided in effect by an upper extension of vertical conduit 60. In this embodiment, vessel 27 of entrainment separator 22 has a top wall 26 that is upperly inclined to central opening 25 above which wall 26 extends by a flange 112 that surrounds the upper extension of conduit 60 mentioned above. At the top of flange 112, wall 26 is extended outwardly by a flange 113. A flange 114 similarly extends outwardly from the bottom end of conduit 32. The flanges 113 and 114 are bolted to each other.

Figure 10:
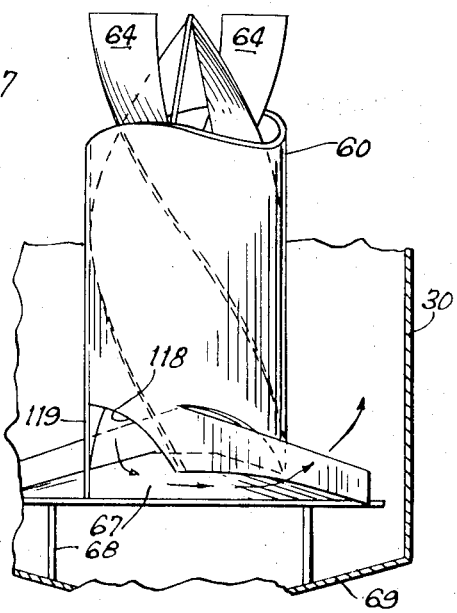
FIG. 10 is a fragmentary vertical sectional view of the entrainment separator of FIG. 8 taken along the line 10—10 of FIG. 9.

The entrainment separator 22 has elongated plates 64 mounted in conduit 60 as in FIG. 1. The plates 64 at their bottom abut conical diverter 67 that has a central flat portion parallel to a transverse plane. The separator 22 is provided with baffles 115. Each baffle 115 extends tangentially from the vertical edge of a generally triangular bottom notch 118 in conduit 60. These notches are seen in FIG. 10. The upper edge of each notch 118 is curved downwardly in the direction of curvature of plate 64 and that edge is concave as viewed from below. The major surfaces of baffles 115 are in vertical planes. The baffles 115 prevent gases that emanate from conduit 60 from moving across the upper surface of diverter 67 where liquid could be thereby reentrained in the gas.

The diverter 67 is supported by legs 68 mounted on inclined bottom 69 that has a central opening 70 for removal of water to vessel 27 to maintain a pool of water below a predetermined level as in the embodiment of FIG. 1.

Figure 9:
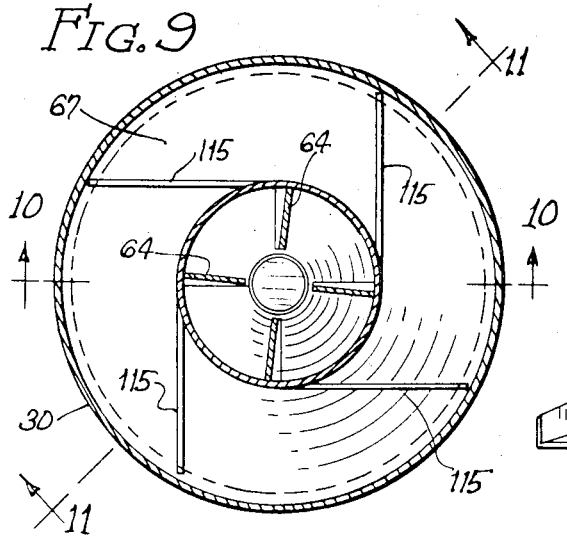
FIG. 9 is a cross-sectional view of the entrainment separator of FIG. 8 taken along the line 9—9 of FIG. 8.

In FIG. 8, the gas-diverting means 43, for purpose of illustration, has the construction shown in FIG. 1. The entrainment separator 22 is provided with a gas-exit conduit 28 that is tangentially communicating with vessel 27 in the same manner as described above for the apparatus of FIG. 1. The tangential direction of baffles 115 are more clearly seen in FIG. 9.

Figure 11:
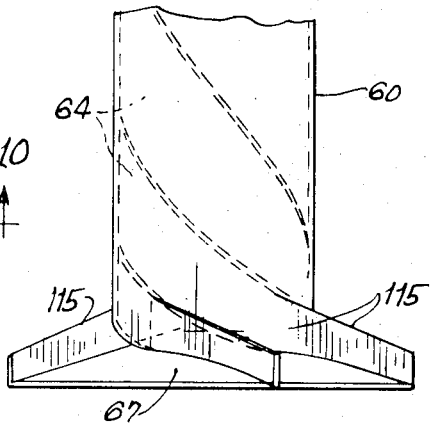
FIG. 11 is a fragmentary elevational view of some of the internal components of a modified embodiment of the entrainment separator of the present invention.

Referring to FIG. 11, the plates 64 have a decreased pitch at their bottom ends to provide a greater degree of helical flow per unit length in the downward direction. This provides a greater centrifugal force for separation of water from the gas.

The flow of gas to be treated, the flow of water used as scrubbing liquid and the flow of separated water and of separated, treated gas are shown in some of the drawings by appropriate arrows.

The foregoing description of various embodiments of the apparatus of the invention, either scrubber or entrainment separator or a combination of these, have been presented for the purpose of illustration only. Various modifications will be apparent to one of ordinary skill in this art from the foregoing description and from the drawings.

For example, instead of using plates 64 in entrainment separator 22, there can be other means for converting an annular flow to a helical flow. Such other construction could be individual longitudinally spaced diverter plates within conduit 60. Accordingly, the present invention is limited only by claims that follows.

I claim:

1. An apparatus for use in the removal of material from a gas by scrubbing with a liquid and separating the resultant liquid particles from the gas in which the liquid becomes entrained; said apparatus including an entrainment separator which comprises:

a cylindrical vessel with a top wall having an opening to provide an inlet for downwardly directed gas from a scrubber and containing entrained scrubbing liquid, with a side wall having an opening near the top wall and with a bottom wall having an opening;

a vertical cylindrical conduit extending downwardly in, and coaxially aligned with, said vessel from said opening in the top wall, to receive all gas passing downwardly through said opening, and spaced from the bottom wall;

means within said vertical conduit to convert a generally annular flow of gas received in the top end of said vertical conduit to a helical downward flow about the longitudinal axis of said vertical conduit comprising elongated flat plates extending downwardly and outwardly, twisted in a helical manner about the longitudinal axis of the vertical conduit and extending inwardly from the inner surface of the vertical conduit to provide the major surfaces of each plate generally at radii of the circle at the various elevations of the vertical conduit, and at least one of the said extensions having a vertical downwardly inclined flange at one end constituting the outer tangential end of the extension, said plates extending below the vertical conduit;

means between the vertical conduit and the bottom wall of the vessel to divert the helical downward gas flow to an outward flow and subsequent upward flow, said means having at least the upper surface of the outer portion of said means below the vertical conduit as a conical surface;

a gas-exit conduit extending generally tangentially from the opening in the side wall in a direction of a component of movement of the helical upward flow.

2. For use in combination with a gas scrubber, an entrainment separator for separating liquid particles from the gas discharged from the gas scrubber comprising:

a vessel having a top wall with an opening therein to define an inlet for receiving gas discharged from said scrubber, a side wall having an opening therein to define an outlet for gas and a bottom wall having an opening therein;

a vertical conduit mounted in said vessel and flow connected to the inlet of the vessel for receiving all of the gas discharged from said scrubber and spaced from said bottom wall;

means mounted in said vertical conduit for converting the generally annular flow of gas received from the scrubber to a helical downward gas flow about the longitudinal axis of the vertical conduit;

means for diverting substantially all of the helical downward gas flow to an outward and subsequent helical upward flow toward said outlet while simultaneously preventing reentrainment of liquid into the gas;

said last-named means having a conical diverter mounted in said vessel below said vertical conduit and vertical baffles tangential to the vertical conduit and attached to said conical diverter in the path of said downward gas flow.

3. The apparatus of claim 2 wherein one end of said vertical conduit is closed by said conical surface and said vertical conduit is provided with at least one opening therein near said conical surface for discharging gas from said vertical conduit into said vessel.

4. For use in combination with a gas scrubber, an entrainment separator for separating liquid particles from the gas discharged from the gas scrubber comprising:

a vessel having a top wall with an opening therein to define an inlet for receiving gas discharged from said scrubber, a side wall having an opening therein to define an outlet for gas and a bottom wall having an opening therein;

a vertical conduit mounted in said vessel and flow connected to the inlet of the vessel for receiving all of the gas discharged from said scrubber and spaced from said bottom wall;

means mounted in said vertical conduit for converting the generally annular flow of gas received from the scrubber to a helical downward gas flow about the longitudinal axis of the vertical conduit;

means for diverting substantially all of the helical downward gas flow to an outward and subsequent helical upward flow toward said outlet while simultaneously preventing reentrainment of liquid into the gas;

said last-named means having a conical diverter mounted in said vessel below said vertical conduit and at least one substantially flat plate twisted in a helical manner about the longitudinal axis of said vertical conduit and extending below the bottom of said vertical conduit.

5. An apparatus for use in the removal of material from a gas by scrubbing with a liquid and separating the resultant liquid particles from the gas in which the liquid becomes entrained, said apparatus including an entrainment separator which comprises:

a cylindrical vessel with a top wall having an opening to provide an inlet for downwardly directed gas from a scrubber and containing entrained scrubbing liquid, with a side wall having an opening near the top wall and with a bottom wall having an opening;

a vertical cylindrical conduit extending downwardly in, and coaxially aligned with said vessel from said opening in the top wall, to receive all gas passing downwardly through said opening, and spaced from the bottom wall;

means within said vertical conduit to convert a generally annular flow of gas received in the top end of said vertical conduit to a helical downward flow about the longitudinal axis of said vertical conduit, comprising elongated plates extending downwardly and twisted in a helical manner about the longitudinal axis of the vertical conduit and extending inwardly from the inner surface of the vertical conduit to provide the major surfaces of each plate generally at radii of the circle at the various elevations of the vertical conduit, said conduit extending to said gas diverter between the conduit and the bottom wall of the vessel, said bottom end of said vertical conduit having generally triangular notches, with one side of each notch being vertical and another being curved downward in a concave manner from the top of vertical side to the bottom end of the conduit, and with the adjacent elongated plate having its outer edge at the conduit adjacent the curved edge of the notch;

means between the vertical conduit and the bottom wall of the vessel to divert the helical downward gas flow to an outward flow and subsequent upward flow, said means having an upper surface that is angularly disposed and downwardly diverging; and a gas-exit conduit extending generally tangentially from the opening in the side wall in a direction of a component of movement of the helical upward flow.

6. The apparatus of claim 5 wherein the entrainment separator further includes vertical baffles that are mounted on the conical surface of the gas diverter below the vertical conduit and that extend tangentially from the vertical edges of the notches to reduce liquid pickup by gas, that flows helically down the vertical conduit, after it passes out of another notch.

* * * * *